Oct. 31, 1933. J. COTAL 1,933,208
CLUTCHING AND SPEED CHANGING DEVICE
Original Filed Feb. 12, 1926 2 Sheets-Sheet 1
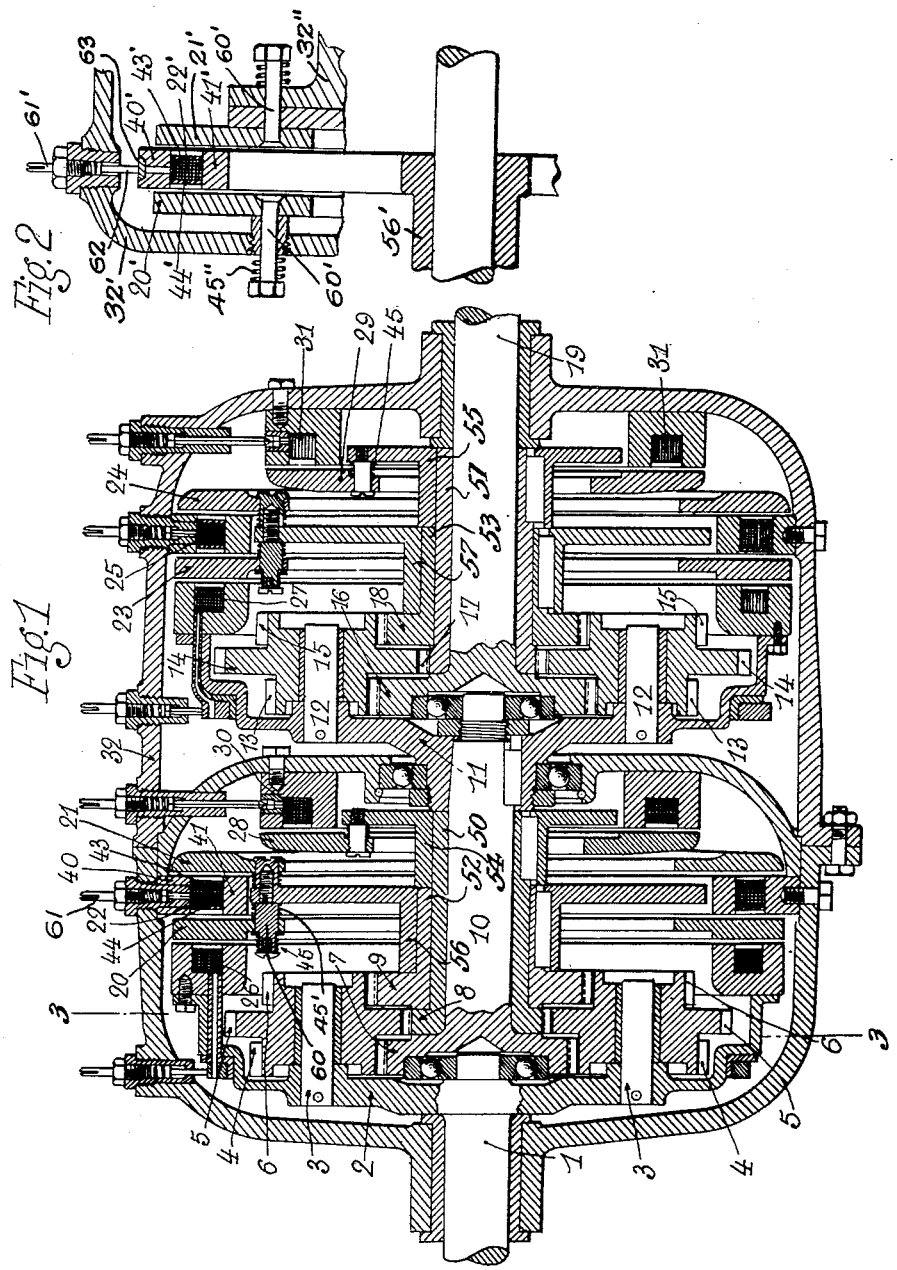
J. Cotal
INVENTOR Oct. 31, 1933.   J. COTAL   1,933,208
CLUTCHING AND SPEED CHANGING DEVICE
Original Filed Feb. 12, 1926    2 Sheets-Sheet 2
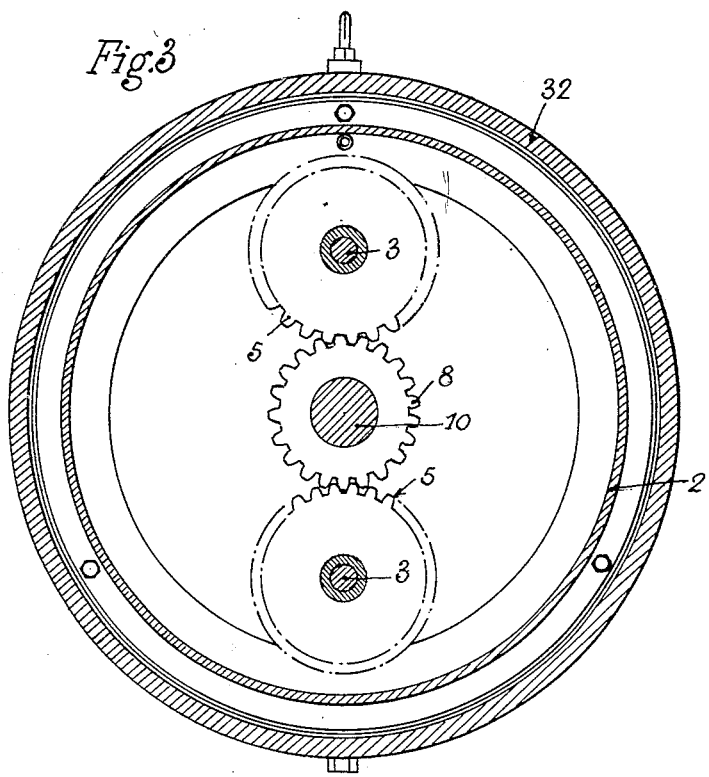
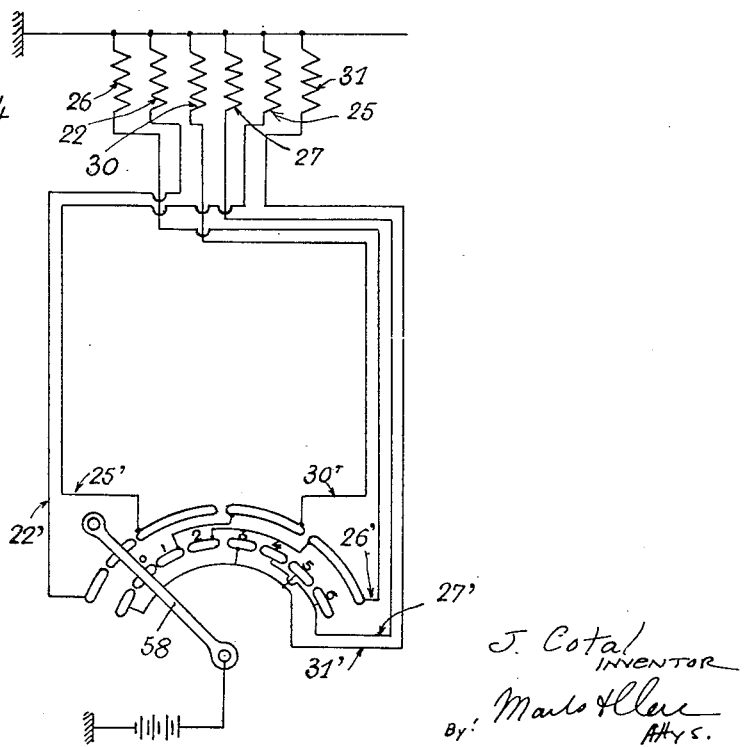

Patented Oct. 31, 1933

1,933,208

UNITED STATES PATENT OFFICE 1,933,208

CLUTCHING AND SPEED-CHANGING DEVICE

Jean Cotal, Paris, France, assignor to Societe D'Exploitation Des Brevets Cotal, Paris, France Original application February 12, 1926, Serial No. 87,884, and in France February 25, 1925. Divided and this application August 3, 1929. Serial No. 383,260

1 Claim. (Cl. 188—72)

Clutching and speed-changing devices are already known in which electrically-controlled electro-magnets hold fast or release at will toothed pinions which are in constant engagement and suitably disposed.

In the case of large gear ratios, the electro-magnets and their armatures should be designed so as to withstand very heavy reactions and, for that reason, their size, weight and cost become prohibitive for the apparatus of moderate power such as motor vehicles.

The present invention which is a division of my pending application No. 87,884 filed February 12, 1926, relates to an improved electro-magnetic clutching and speed-changing device capable of furnishing a large scale of gear ratios without requiring constituent parts of any great size. In this device, one or more of the electro-magnets utilized are each provided with two armatures which are connected with each other and are disposed on either sides of the winding. Said arrangement of two armatures upon the same electro-magnet makes it possible to double the carrying area of same and to augment the maximum power transmission capacity of the apparatus. Such an electro-magnet with two armatures may be rotatably mounted or may be held stationary; it may be used either as a clutching device or as a braking device.

By way of example, a constructional form of the device according to the invention with stationary electro-magnets having two armatures, is shown in lengthwise section in Fig. 1 of the appended drawings.

Fig. 2 shows a different arrangement of the double-armature electro-magnet.

Fig. 3 is a section on the line 3—3 of Fig. 1.

Fig. 4 shows diagrammatically the controller sending the current into the device.

In this constructional form, the primary shaft 1 carries an element or disc 2 upon which are mounted axles 3 upon which rotate a suitable number of planetary pinions 4, 5, 6 which are secured to each other and are shown in Fig. 1 as forming an integral member; said pinions are respectively in gearing engagement with a suitable number of sun gears 7, 8, 9. One of the said sun gears, 7 for instance, is secured to an intermediate shaft 10 which is preferably situated in line with the shaft 1.

A disc 11 preferably similar to the disc 2 is secured to the shaft 10 and carries axles 12 upon which are rotatable a suitable number of planetary pinions 13, 14, 15 which are also shown in Fig. 1 as forming an integral member and are respectively in engagement with a suitable number of sun gears 16, 17, 18. One of the sun gears 16 for instance, is secured to the secondary shaft 19 which is preferably in line with the shafts 1 and 10.

The sun gears 8, 9, 17, 18 are secured to concentric hollow shafts such as 50, 52, 51, 53 carrying sleeves such as 54, 56, 55, 57 which are provided with guiding members 60 on which the armatures 20, 21, 23, 24, 28, 29 are enabled, by means of springs such as 45 and 45' to move slightly in a direction parallel with the driving axle. The sun gear 9 is secured to the sleeve 56 and consequently to two armatures 20, 21 situated on each side of an annular electro-magnet.

This annular electro-magnet is preferably constituted by two concentric rings of magnetic metal 40 and 41 and in the annular space between said rings is disposed the annular energizing coil 22 which is held in place for instance by two cheeks 43, 44 of non-magnetic material which are suitably attached to the rings 40, 41 which are thus secured together and form a device which is mounted on the wall of the casing 32 of the apparatus. Current is supplied to the coil 22 through the terminal 61.

Since the improved electro-magnet is provided with two armatures, when it is energized the area in contact will be double what can be obtained with a single armature, so that the adhesion will be augmented proportionately without increasing the length of the magnetic circuit and the weight and outside dimensions of the device.

On the sun gear 18 are similarly secured two armatures 23 and 24 situated on each side of another special electro-magnet 25 composed in the same manner as the electro-magnet 22 with like advantages. It is obvious that any of said special electro-magnets might present any other preferred arrangement, having for instance, two fixed armatures and rotary rings and winding as represented in Fig. 2 of the appended drawings. In said Figure 2, the concentric rings 40', 41' with the cheeks 43', 44' and the coil 22' are secured to a rotatable sleeve 56' and the armatures 20' and 21' are carried on studs 60', which are guided in the stationary members 32', 32'' and which are adapted by means of springs 45'' to move slightly towards and away from the electromagnet 40'—41'—22'. Current is supplied to the coil 22' through the terminal 61', the contact brush 62 and the contact ring 63 secured on the ring 40'.

In these two successive sets of elements, the armature 20 and the armature 23 may be also respectively held fast against the rotary electro-magnets 26 and 27 which are mounted on the discs 2 and 11, these being supplied with electric current by a well known device comprising slip rings and brushes.

The sun gears 8 and 17 are connected through the members 50—54 and 51—55 with the respective armatures 28, 29 of the two electro-magnets 30, 31 which are preferably mounted on the walls of the casing 32 provided for the whole device.

The electric connections of the windings of the electromagnets with the controller 58 are diagrammatically shown in Fig. 4.

The device as illustrated may be operated in the following manner:

Sixth or highest speed in direct drive.

To obtain the transmission in direct engagement, the current is sent into the rotary electro-magnets 26, 27 by means of a controller and suitable conductors not shown. The electro-magnet 26 actuates the sun gear 9 by means of the armature 20. The epicyclic train or gearing of which the said sun gear forms a part is thus held together and is actuated both by the axles 3 of the planetary pinions, and by the sun gear 9, so that the whole set of gearing and hence the intermediate shaft 10 rotate at the same speed as the main or primary shaft 1. The electro-magnet 27 actuates the sun gear 18 by means of the armature 23. In the same manner as above explained for the first set of gearing, one obtains in this second set, upon the secondary shaft 19, a speed equal to that of the intermediate shaft 10 i. e. equal to that of the driving shaft 1.

Fifth speed combination.—The electro-magnets 26 and 31 are energized. In the same manner as above set forth for the first set of gearing in the preceding combination, the intermediate shaft 10 rotates at the same speed as the driving shaft 1. The electro-magnet 31, by its armature 29, holds fast the sun gear 17 around which the planetary pinions 14 will now turn, drawing with them the other planetary pinions in their rotation about their axles 12.

Since the planetary pinions 13 are engaged with the sun gear 16, and since the planetary pinions 13 have a much smaller diameter than the planetary pinions 14, the shaft 19 will be driven in the same direction as the shaft 10 at a speed which is somewhat below that of the shaft 10 and hence below that of the main driving shaft 1.

Fourth speed combination.—The electro-magnets 30 and 27 are energized. The electro-magnet 30, by means of its armature, will hold the sun gear 8 about which the planetary pinions 5 will now rotate drawing with them the other planetary pinions in their rotation about the axles 3. The planetary pinions 4 are engaged with the sun gear 7, and since the planetary pinion 4 is much smaller than the planetary pinion 5, the intermediate shaft 10 will be actuated at a speed below that of the shaft 1. By means of the electro-magnet 27, as previously set forth for the sixth speed combination, the secondary shaft 19 is driven at the same speed as the shaft 10 i. e. at a speed below that of the main driving shaft 1. The resulting speed of the secondary shaft is slightly below what is obtained in the preceding case.

Third speed combination.—The electro-magnets 30 and 31 are energized. By means of the electro-magnet 30, as previously set forth for the fourth speed combination, the sun gear 8 is held fast, and by the action of the epicyclic train of gearing, the intermediate shaft 10 is driven at a speed below that of the driving shaft 1. Due to the electro-magnet 31, the sun gear 17 is held fast, and as in the case of the fifth speed combination, by means of the epicyclic gearing, the secondary shaft 19 will now be driven at a speed below that of the shaft 10 and a fortiori below that of the shaft 1. There is a double speed reduction, and the resulting speed of the secondary shaft is somewhat below what is obtained with the fourth speed combination.

Second speed combination.—The electro-magnets 26 and 25 are energized. Due to the electro-magnets 26, as observed for the sixth and for the fifth speeds, there will be obtained for the shaft 10 a speed equal to that of the primary shaft 1. The electro-magnet 25, by means of its double armature 23—24 which has now made contact,—and herein a strong energetic braking torque ought to be obtained—holds fast the sun gear 18 about which the planetary pinions 15 will now rotate. The planetary pinions 13 which are in gearing engagement with the sun gear 16, and since the planetary pinions 13 are not much smaller than the planetary pinions 15, the resulting speed of the secondary shaft 19 will be much below that of the shaft 10 and therefore below that of the primary shaft 1. The said resulting speed will be below the third speed.

First speed combination.—The electro-magnets 30 and 25 are energized. The electro-magnet 30 as mentioned for the fourth speed, imparts to the shaft 10 a speed which is below that of the shaft 1. The electro-magnet 25 as set forth for the second speed, imparts to the shaft 19 a speed which is much below that of the shaft 10. This double reduction of speed between the shaft 1 and the secondary shaft 19 permits to obtain on the latter shaft a very slow speed which is less than the speed which is obtained in the case of the second speed.

Reverse speed combination.—The electro-magnets 22 and 31 are energized. The electro-magnet 22 attracts its double armature 20, 21—and in this case the reaction torque ought to be also very strong—and will hold the sun gear 9 about which the planetary pinions 6 will now rotate. The planetary pinions 4 are engaged with the sun gear 7, and since the planetary pinions 4 have a larger diameter than the planetary pinions 6, the shaft 10 will be driven at a reduced speed in a direction contrary to that of the primary shaft 1. As stated with reference to the fifth speed, electro-magnet 31, will impart to the shaft 19 a speed below that of the shaft 10. Since the shaft 10 rotates in a direction contrary to that of the shaft 1, the actuated shaft 19 will also rotate in a direction contrary to the primary shaft, but at a more reduced speed than that which is obtained directly upon the shaft 10.

To provide for reverse speeds which are faster or slower than the one above mentioned, the electro-magnets 22 and 27 or the electro-magnets 22 and 25 might be energized simultaneously.

General uncoupling.—In this event, none of the electro-magnets are energized, and if the primary shaft 1 is now in motion, the sun gears 7, 8, 9, 17 and 18 will rotate loosely, so that the secondary shaft 19 will not be actuated.

In particular the scope of application of the double armature electro-magnet is obviously not limited to the example shown. Said arrangement of an electro-magnet with a double armature may be used for the electro-magnet 26 or 27.

Having now described my invention what I claim as new and desire to secure by Letters Patent is:

In combination: two circular rings of magnetic material disposed concentrically one without the other at a distance from each other, a circular coil disposed in the annular space between said two circular rings, means for connecting rigidly said two rings and said coil so as to form with said rings and coil a first unit, on each of both sides of said first unit an annular armature of magnetic material adapted to bear simultaneously on said two rings and to be moved away from said rings, a support concentrically disposed with relation to said rings, guiding means on said support adapted to carry said armatures and to allow said armatures to be moved towards and away from said first unit, said support forming with said guiding means and said armatures a second unit in concentric relation with the first unit, spring means adapted to move said armatures away from said rings, a stationary member, connecting means between said stationary member and one of said units, a rotatable member disposed concentrically with relation to said units, means for rotating said rotatable member, connecting means between said rotatable member and the other of said units, and electric conducting means adapted to lead an electric current into said coil and whereby each of said two armatures may be applied against said two rings, whereby the unit connected with said stationary member exerts a braking action on the unit connected with said rotatable member and consequently also on said rotatable member.

JEAN COTAL.